US012190797B2

(12) United States Patent
Hwang et al.

(10) Patent No.: US 12,190,797 B2
(45) Date of Patent: Jan. 7, 2025

(54) PIXEL AND DISPLAY APPARATUS OF WHICH STATIC POWER CONSUMPTION IS REDUCED

(71) Applicant: SAPIEN SEMICONDUCTORS INC., Seongnam-si (KR)

(72) Inventors: Sung Ho Hwang, Seongnam-si (KR); Ji Haeng Lee, Seongnam-si (KR); Hye Min Bae, Seongnam-si (KR); Dae Young Jung, Seongnam-si (KR)

(73) Assignee: SAPIEN Semiconductors Inc., Gyeonggi-do (KR)

( * ) Notice: Subject to any disclaimer, the term of this patent is extended or adjusted under 35 U.S.C. 154(b) by 0 days.

(21) Appl. No.: 18/498,244

(22) Filed: Oct. 31, 2023

(65) Prior Publication Data

US 2024/0062714 A1 Feb. 22, 2024

Related U.S. Application Data

(63) Continuation-in-part of application No. 17/946,601, filed on Sep. 16, 2022, now Pat. No. 11,922,860.

(30) Foreign Application Priority Data

May 6, 2022 (KR) ........................ 10-2022-0055973
Jun. 23, 2022 (KR) ........................ 10-2022-0076549

(51) Int. Cl.
*G09G 3/32* (2016.01)

(52) U.S. Cl.
CPC ....... *G09G 3/32* (2013.01); *G09G 2300/0842* (2013.01); *G09G 2300/0852* (2013.01); *G09G 2310/0251* (2013.01); *G09G 2330/021* (2013.01)

(58) Field of Classification Search
CPC .................................................... G09G 3/2014
See application file for complete search history.

(56) References Cited

U.S. PATENT DOCUMENTS

| | | | | |
|---|---|---|---|---|
| 2003/0178946 A1* | 9/2003 | Nakamura | G09G 3/3233 315/169.3 |
| 2005/0078076 A1 | 4/2005 | Kim et al. | |
| 2005/0225683 A1 | 10/2005 | Nozawa | |
| 2010/0066714 A1* | 3/2010 | Ozaki | G09G 3/2081 345/207 |
| 2012/0001618 A1* | 1/2012 | Herke | H02J 7/0049 324/76.11 |

(Continued)

FOREIGN PATENT DOCUMENTS

| | | |
|---|---|---|
| KR | 102220960 B1 | 2/2021 |
| KR | 20210053821 A | 5/2021 |

OTHER PUBLICATIONS

Action issued in the Korean Patent Office in Korean Application No. 10-2022-0076549 dated Sep. 13, 2023.

(Continued)

*Primary Examiner* — Nan-Ying Yang
(74) *Attorney, Agent, or Firm* — You & IP, LLC

(57) ABSTRACT

Provided is a pixel driving circuit including a first circuit configured to control, in a data writing mode, a signal related to driving of one or more light-emitting elements, and a second circuit configured to supply, in a driving mode, power to the one or more light-emitting elements based on a signal transmitted from the first circuit.

5 Claims, 8 Drawing Sheets

(56) References Cited

U.S. PATENT DOCUMENTS

| | | | |
|---|---|---|---|
| 2016/0267837 | A1 | 9/2016 | Wang et al. |
| 2017/0092178 | A1 | 3/2017 | Lee et al. |

OTHER PUBLICATIONS

Office Action issued in parent U.S. Appl. No. 17/946,601 mailed Mar. 9, 2023.

Final Office Action issued in parent U.S. Appl. No. 17/946,601 mailed Jul. 21, 2023.

* cited by examiner

PIXEL AND DISPLAY APPARATUS OF WHICH STATIC POWER CONSUMPTION IS REDUCED

CROSS-REFERENCE TO RELATED APPLICATION

This application is a continuation-in-part of U.S. patent application Ser. No. 17/946,601, filed on Sep. 16, 2022, which is based on and claims priority under 35 USC § 119 to Korean Patent Application No. 10-2022-0055973, filed on May 6, 2022 and No. 10-2022-0076549, filed on Jun. 23, 2022 in the Korean Intellectual Property Office, the disclosure of which is incorporated by reference herein in its entirety.

BACKGROUND

1. Field

The disclosure relates to a pixel included in a display apparatus, and more particularly, to a pixel driving circuit with reduced static power consumption.

2. Description of the Related Art

A typical display apparatus includes a plurality of pixels, and M*N pixels arranged therein. Each pixel may include one or more light-emitting elements, and typically includes three light-emitting elements (R, G, B). Each light-emitting element is called a sub-pixel.

One of various methods of controlling the driving of sub-pixels is a pulse width modulation (PWM) control method in which image data is stored in a built-in memory, the image data being used to control emission of sub-frames during a single frame, and gradation is controlled through a PWM signal. For PWM control, a pixel driving circuit for driving each pixel may be implemented using a transistor, but may be divided into a digital circuit and an analog circuit according to an operation region of the transistor.

The digital circuit operates in a cut off region and a non-saturation region respectively corresponding to On and Off to express '0' and '1.' On the other hand, analog circuits such as an amplifier or bias (except analog switches) operate in a saturation region, and accordingly, a constant current needs to be continuously consumed during the operation time of the circuit. The same power may not always be required depending on a display driving mode or screen, and thus, a way of reducing static power consumption in the pixel driving circuit is required.

The background art described above is technique that the inventor had to derive the disclosure or technical information acquired during the process of deriving the same, and is not necessarily a technique known to the general public prior to the filing of the disclosure.

SUMMARY

One or more embodiments provide a low-power pixel driving circuit. The problem to be solved by the disclosure is not limited to that mentioned above, and other objectives and advantages of the disclosure that are not mentioned can be understood from the following description, and more clearly understood in view of the embodiments of the disclosure. In addition, it will be obvious that the objectives and advantages to be solved by the disclosure can be implemented by means and combinations thereof indicated in the claims.

Additional aspects will be set forth in part in the description which follows and, in part, will be apparent from the description, or may be learned by practice of the presented embodiments of the disclosure.

A pixel driving circuit according to a first aspect of the disclosure includes a first circuit configured to control, in a data writing mode, a signal related to driving of one or more light-emitting elements, and a second circuit configured to supply, in a driving mode, power to the one or more light-emitting elements based on a signal transmitted from the first circuit.

A display apparatus according to a second aspect of the disclosure includes a display panel including an array of a plurality of pixel driving circuits forming rows and columns, a scan driving circuit configured to sequentially output row signals to pixel driving circuits arranged in a row direction in the array included in the display panel, and a data driving circuit configured to output column signals related to driving of light-emitting elements respectively corresponding to the plurality of pixel driving circuits, to pixel driving circuits arranged in a column direction in the array included in the display panel, wherein each of the plurality of pixel driving circuits includes the pixel driving circuit according to the first aspect.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
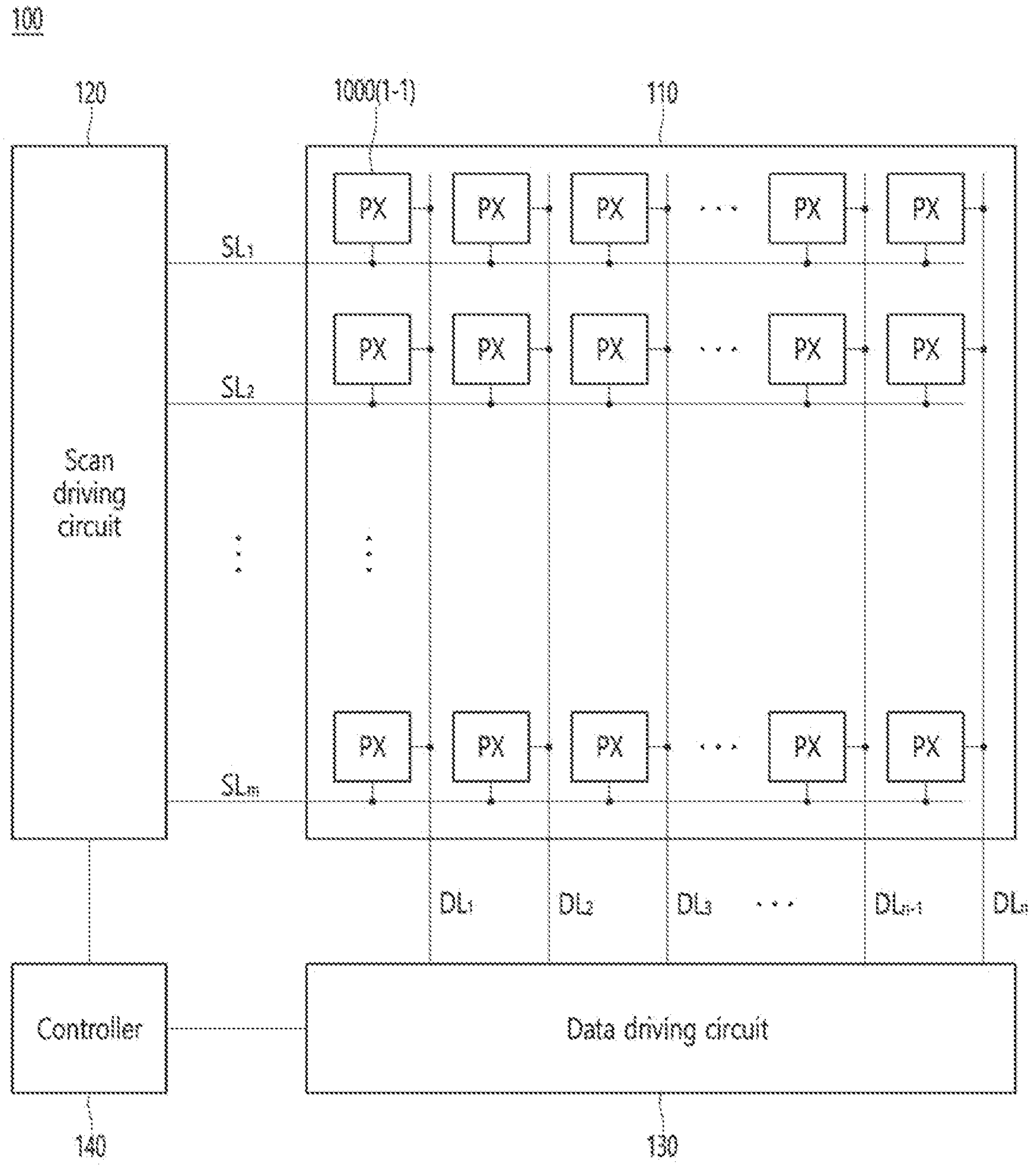
FIG. 1 is a display apparatus including a plurality of pixel driving circuits, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. The embodiments are merely described below, by referring to the figures, to explain aspects. As used herein, the term "and/or" includes any and all combinations of one or more of the associated listed items. Expressions such as "at least one of" when preceding a list of elements, modify the entire list of elements and do not modify the individual elements of the list.

The advantages and features of the disclosure and methods of achieving the advantages and features will be described more fully with reference to the accompanying drawings, in which embodiments of the disclosure are shown. The disclosure may, however, be embodied in many different forms and should not be construed as being limited to the embodiments set forth herein, and it is to be appreciated that all changes, equivalents, and substitutes that do not depart from the spirit and technical scope of the disclosure are encompassed in the disclosure. Rather these embodiments are provided so that this disclosure will be thorough and complete, and will fully convey the concept of the disclosure to one of ordinary skill in the art. In the description of the disclosure, certain detailed explanations of related art are omitted when it is deemed that they may unnecessarily obscure the essence of the disclosure.

The terms used in the embodiments are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

The terms used in the present specification are merely used to describe particular embodiments, and are not intended to limit the disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

In the present description, terms including ordinal numbers such as 'first,' 'second,' etc. are used to describe various elements but the elements should not be defined by these terms. The terms are used only for distinguishing one element from another element.

In the following embodiments, "ON" used in connection with an element state may refer to an activated state of an element, and "OFF" may refer to a deactivated state of the element. As used in connection with a signal received by an element, "on" may refer to a signal that activates the element, and "off" may refer to a signal that deactivates the element. An element may be activated by a relatively high voltage or a relatively low voltage. For example, a P-type transistor may be activated by a relatively low voltage. An N-type transistor is activated by a relatively high voltage. Accordingly, it should be noted that an "on" voltage for a P-type transistor and that for an N-type transistor are opposite voltage levels to each other (low versus high).

When an element is referred to as being "connected to" another element, it may be construed that the element is connected to the other element not only directly but also through another element therebetween. Hereinafter, embodiments of the disclosure will be described in detail with reference to the accompanying drawings.

FIG. 1 is a display apparatus including a plurality of pixel driving circuits, according to an embodiment.

Referring to FIG. 1, a display apparatus 100 according to an embodiment may include a display panel 110, a scan driving circuit 120, a data driving circuit 130, and a controller 140.

In the disclosure, the display panel 110 may include a plurality of pixels PX. In an embodiment, the plurality of pixels PX may be configured in a matrix form in which M*N (M and N are natural numbers) pixels are arranged. However, the arrangement of the plurality of pixels PX may be in various patterns such as a zigzag type, according to another embodiment.

In the disclosure, the display panel 110 may be implemented using one of a liquid crystal display (LCD), a light-emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electroluminescent display (ELD), a vacuum fluorescent display (VFD), and other types of flat panel displays or flexible displays. In the disclosure, the display panel 110 will be described as being implemented as an LED display as an example.

In the disclosure, each of the plurality of pixels PX may include one or more light-emitting elements. In an embodiment, the light-emitting element may include an LED. The LED may include a micro LED having a size of 100 μm or less. In an embodiment, one pixel PX may output various colors through a plurality of light-emitting elements having different colors. As an example, one pixel PX may include a light-emitting element composed of red, green, and blue colors. As another example, one pixel PX may further include a white light-emitting element, and the white light-emitting element may replace any one of the red, green, and blue light-emitting elements. As another example, one pixel PX may include one white light-emitting element. In an embodiment in which a plurality of light-emitting elements are included in one pixel PX, each light-emitting element included in one pixel PX may be referred to as a 'sub-pixel.'

In the disclosure, each pixel PX may include a pixel driving circuit for driving a light-emitting element included in the pixel, that is, a sub-pixel. In the disclosure, the pixel driving circuit may drive a turn-on or turn-off operation of a sub-pixel by a signal output from the scan driving circuit 120 and/or the data driving circuit 130. In an embodiment, the pixel driving circuit may include at least one transistor, at least one capacitor, and the like. In an embodiment, the pixel driving circuit may be implemented by a stacked structure on a semiconductor wafer.

In the disclosure, the display panel 110 may include one or more scan lines $SL_1$ to $SL_m$ arranged in a row direction and one or more data lines $DL_1$ to $DL_n$ arranged in a column direction. In the disclosure, the pixel PX may be located at an intersection of the one or more scan lines $SL_1$ to $SL_m$ and the one or more data lines $DL_1$ to $DL_n$. Each pixel PX may be connected to any one scan line $SL_k$ and any one data line $DL_k$. The one or more scan lines $SL_1$ to $SL_m$ may be connected to the scan driving circuit 120, and the one or more data lines $DL_1$ to $DL_n$ may be connected to the data driving circuit 130.

In the disclosure, the scan driving circuit 120 may output a signal for driving one or more pixels connected to any one of the one or more scan lines $SL_1$ to $SL_m$ (hereinafter, a row signal). The scan driving circuit 120 may sequentially select the one or more scan lines $SL_1$ to $SL_m$. For example, a pixel connected to a first scan line $SL_1$ may be driven during a first scan driving period, and a pixel connected to a second scan line $SL_2$ may be driven during a second scan driving period. The operation of the scan driving circuit 120 according to the disclosure will be described in detail later.

In the disclosure, the data driving circuit 130 may output a signal related to gradation (hereinafter, a column signal) to each pixel through the one or more data lines $DL_1$ to $DL_n$. Although one data line is connected to one or more pixels in a longitudinal direction, a signal related to gradation may be input only to pixels connected to a scan line selected by the scan driving circuit 120. The operation of the data driving circuit 130 according to the disclosure will be described in detail later.

In the disclosure, the controller 140 may output a control signal to perform the operations of the scan driving circuit 120 and the data driving circuit 130. The controller 140 may output a control signal corresponding to image data corresponding to one image frame, to the scan driving circuit 120 or the data driving circuit 130.

Figure 2:
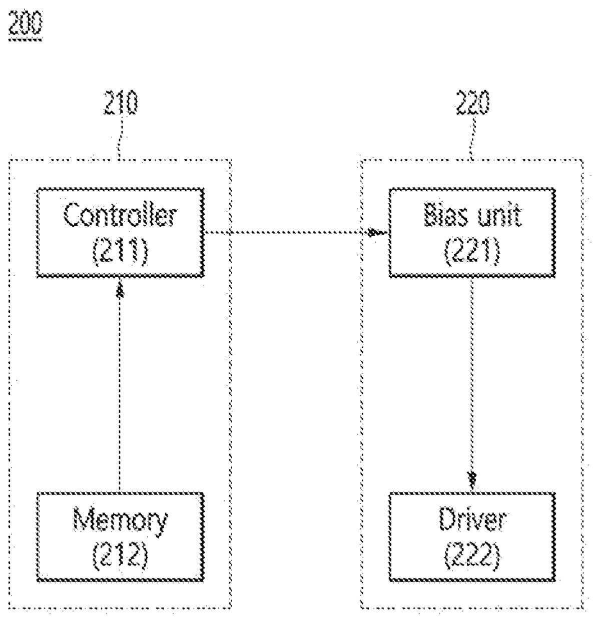
FIG. 2 is a block diagram schematically illustrating a pixel driving circuit according to an embodiment.

FIG. 2 is a block diagram schematically illustrating a pixel driving circuit according to an embodiment.

Referring to FIG. 2, a pixel driving circuit 200 according to the disclosure may include a first circuit 210 and a second circuit 220. In the disclosure, the first circuit 210 may also be referred to as a digital circuit, and may operate in a data writing mode. In the disclosure, the second circuit 220 may also be referred to as an analog circuit, and may operate in a driving mode.

Although not showed in FIG. 2, the pixel driving circuit 200 according to the disclosure may include terminals VCC, GND for receiving power, terminals R, G, B for outputting an emission control signal to one or more light-emitting elements, a terminal ROW for receiving a row signal output from the scan driving circuit 120, and a terminal COL for receiving a column signal output from the data driving circuit 130. It will be obvious to one of ordinary skill in the art that electrical connections may be configured such that power and signals may be input or output through the terminals described above.

In an embodiment, the first circuit 210 may include a controller 211 and a memory 212. As described above, the first circuit 210 may operate in a data writing mode.

In an embodiment, the memory 212 may be configured to store data related to the control of a pixel or a light-emitting element according to the disclosure. In an embodiment, the memory 212 may include a video memory (first memory) and a charging control memory (second memory). The video memory may store bit values of image data. The image data stored in the video memory may refer to data related to gradation at which a light-emitting element emits light during one frame or one pulse width modulation (PWM) cycle. The second memory may store bit values related to charging of a capacitor included in a driver 222 to be described later. The operation of the memory according to the disclosure will be described in detail later.

In an embodiment, the controller 211 may control the operation of the capacitor included in the driver 222 by controlling bias unit (also, referred as a bias or a bias circuit) 221. In an embodiment, the controller 211 may control whether to charge the capacitor, based on the bit values stored in the charging control memory. The operation of the capacitor according to the disclosure will be described in detail later.

In an embodiment, the second circuit 220 may include a bias unit 221 and the driver 222. As described above, the second circuit 220 may operate in the driving mode.

In an embodiment, the driver 222 may control for supplying power to one or more light-emitting elements based on data stored in the memory 212. In detail, the driver 222 may supply power to one or more light-emitting elements based on image data stored in the video memory. In an embodiment, the driver 222 may be configured to control the power supply of a light-emitting element according to a PWM driving method, and as the PWM driving method is a technique known to those skilled in the art, a detailed description thereof will be omitted.

In an embodiment, the bias unit 221 may supply bias power to the driver 222. In order to supply bias power, the bias unit 221 may be connected to a terminal VCC for receiving power. The operation of the bias unit according to the disclosure will be described in detail later.

The pixel driving circuit 200 according to the disclosure may further include a power generator (not shown). The power generator may output a reference voltage VDD to the memory 212, based on a row signal output from the scan driving circuit 120 and a column signal output from the data driving circuit 130.

The pixel driving circuit 200 according to the disclosure may further include a reset unit (not shown) that outputs a reset signal RSTB for initializing data stored in the memory 212, to the memory 212.

Figure 3:
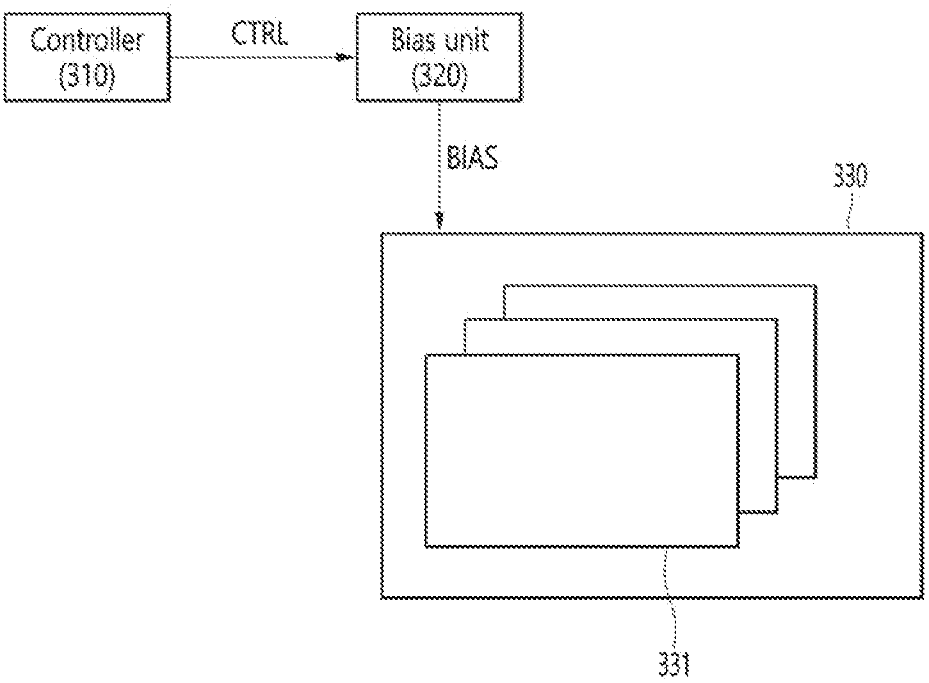
FIG. 3 is a schematic diagram for describing a configuration and operation of a driver, according to an embodiment.

FIG. 3 is a schematic diagram for describing a configuration and operation of a driver, according to an embodiment.

Referring to FIG. 3, a controller 310, a bias unit 320, and a driver 330 including one or more sub-drivers 331 are illustrated. In FIG. 3, the controller 310 may be a configuration corresponding to the controller 211 of FIG. 2, and the bias unit 320 may be a configuration corresponding to the bias unit 221 of FIG. 2, and the driver 330 may be a configuration corresponding to the driver 222 of FIG. 2.

In the disclosure, the driver 330 may control to supply power to one or more light-emitting elements. In an embodiment, the driver 330 may include one or more sub-drivers 331 respectively corresponding to one or more light-emitting elements. That is, the pixel according to the disclosure may include one or more light-emitting elements, and one sub-driver 331 may be configured to correspond to one light-emitting element.

In an embodiment, the driver 330 may control to supply power to one or more light-emitting elements based on data stored in a memory. In detail, the sub-driver 331 may control power supply to the light-emitting element based on data stored in a memory. In detail, the sub-driver 331 may supply power to a light-emitting element based on image data stored in a video memory. In an embodiment, the sub-driver 331 may include a capacitor for charging power required for driving a light-emitting element, and the capacitor according to the disclosure will be described in detail later.

In the disclosure, the bias unit 320 may supply bias power to the driver 330, and specifically, the bias unit 320 may supply bias power to the sub-driver 331. To supply bias power to the sub-driver 331, the bias unit 320 may be connected to a terminal VCC through which a pixel driving circuit receives power.

In an embodiment, whether to supply power to the sub-driver 331 by the bias unit 320 may be controlled by a control signal CTRL output from the controller 310. In an embodiment, the control signal CTRL for controlling whether to supply power to the sub-driver 331 by the bias unit 320 may be output from the controller 310. In an embodiment, a function of controlling the operation of a capacitor by the controller 310 may be performed in a separate configuration from the controller 310, but is not limited thereto.

In an embodiment, power supplied by the bias unit 320 may be stored in a capacitor included in the sub-driver 331.

In an embodiment, the controller 310 may control whether to charge the capacitor based on the bit values stored in the second memory. In other words, the controller 310 may output the control signal CTRL based on the bit values stored in the second memory to control whether to supply power by the bias unit 320 and whether to charge the capacitor.

Figure 4A:
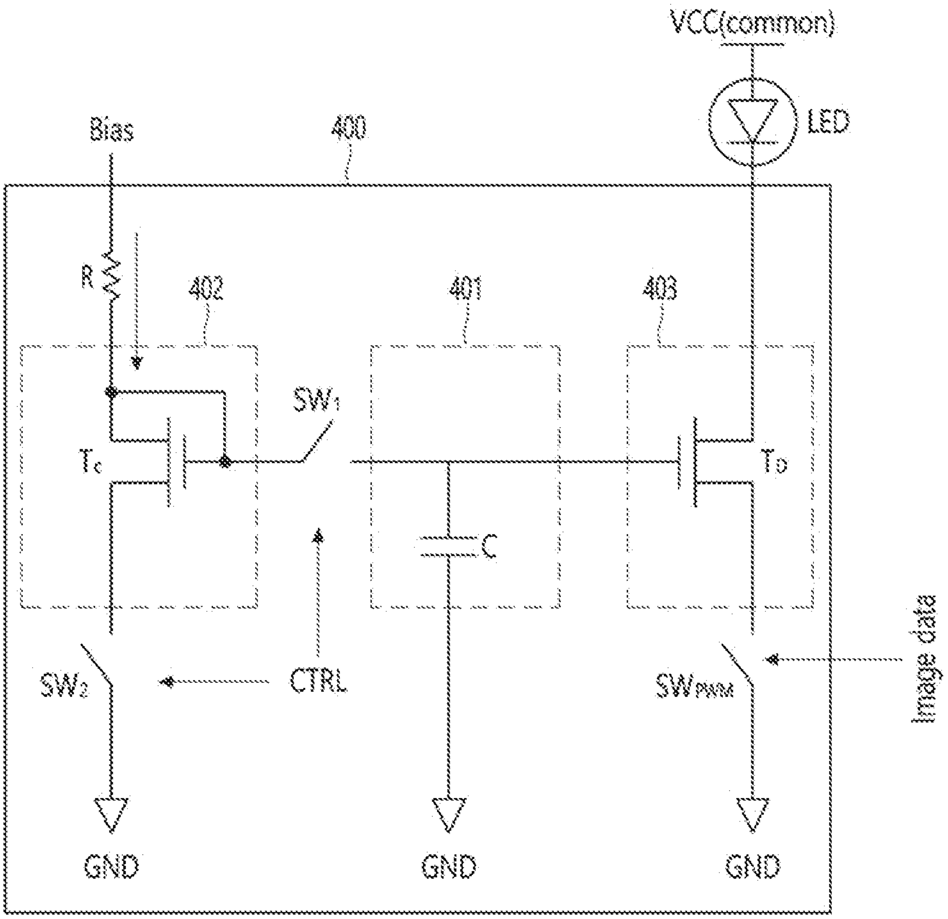
FIGS. 4*a* and 4*b* are circuit diagrams for describing configurations of sub-drivers according to embodiments.
Figure 4B:
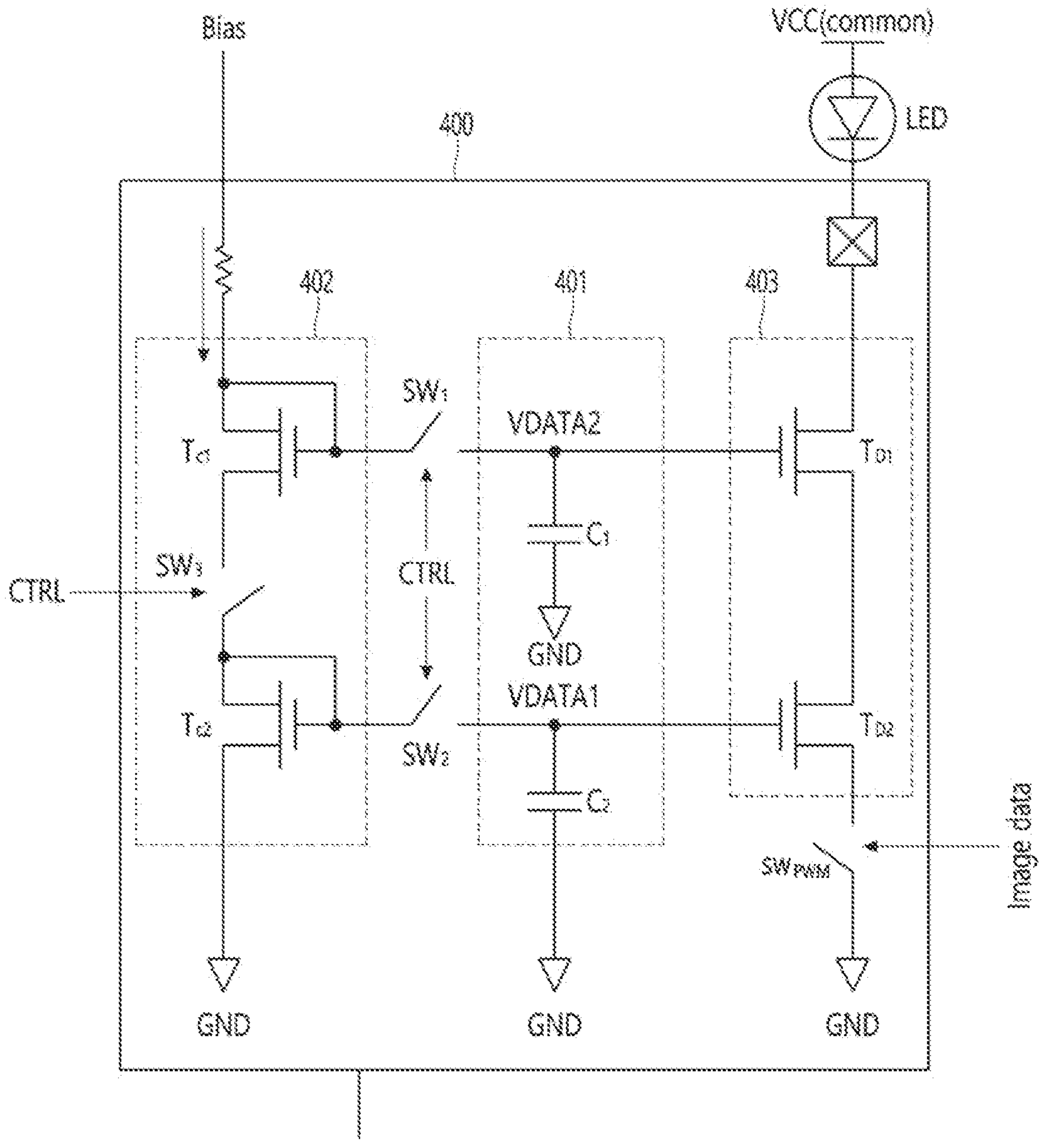

FIGS. 4*a* and 4*b* are circuit diagrams illustrating configurations of sub-drivers according to embodiments.

Referring to FIG. 4*a*, a sub-driver 400 according to an embodiment may include a capacitor C 401 for storing the power to drive LED, a charging transistor $T_C$ 402 for supplying the power to the capacitor 401, a discharging transistor $T_D$ 403 for supplying the stored power in the capacitor 401 to the LED by discharging the stored power in the capacitor 401, and switches SW1, SW2, and $SW_{PWM}$. In FIG. 4*a*, the sub-driver 400 may have a configuration corresponding to the sub-driver 331 of FIG. 3.

Referring to FIG. 4*a*, the charging transistor 402 may be connected between a bias unit and GND. The discharging transistor 403 may be connected between VCC and GND. The capacitor 401 may be connected between the gate terminal of the charging transistor 402 and the gate terminal of the discharging transistor 403. The switch SW1 may be connected between the gate terminal of the charging transistor 402 and the capacitor 401. The switch SW2 may be connected between the charging transistor 402 and GND. The switches SW1 and SW2 may be turned on or off by a control signal CTRL output from the controller 310.

FIG. 4*b* illustrates another embodiment in which the capacitor unit 401 is configured with two capacitors, that is, a first capacitor $C_1$ and a second capacitor $C_2$. The first capacitor $C_1$ may be connected between a pixel negative power source GND and a first connection line connecting the charging unit 402 to the discharging unit 403. The second capacitor $C_2$ may be connected between the pixel negative power source and a second connection line connecting the charging unit 402 to the discharging unit 403. Here, the charging unit 402 may include a first charging transistor $T_{C1}$ and a second charging transistor $T_{C2}$ respectively connected to the first capacitor $C_1$ and the second capacitor $C_2$ between the pixel positive power source and the pixel negative power source. The discharge unit 403 may include a first discharge transistor $T_{D1}$ and a second discharge transistor $T_{D2}$ respectively connected to the first capacitor $C_1$ and the second capacitor $C_2$ between the pixel positive power source and the pixel negative power source. The switch unit SW may include a first switching element $SW_1$ connected between the first charging transistor $T_{C1}$ and the first capacitor $C_1$ and a second switching element $SW_2$ connected between the second charging transistor $T_{C2}$ and the second capacitor $C_2$. The switch unit SW may further include a third switching element $SW_3$ connected between the first charging transistor $T_{C1}$ and the second charging transistor $T_{C2}$. The sub-driver 400 may further include a PWM switching element $SW_{PWM}$ connected in series with the discharge unit 403 between the pixel positive power source and the pixel negative power source. The PWM switching element $SW_{PWM}$ may be turned on or off according to image data stored in a memory.

The sub-driver 400 of FIG. 4*a* or FIG. 4*b* is provided as an example, and the elements included in the sub-driver 400 and a circuit configuration according to connection of the elements may be configured differently. For example, while the sub-driver 400 is illustrated as including a transistor which is an NMOSFET in FIG. 4*a*, in another embodiment, the sub-driver 400 may include a transistor which is a PMOSFET, and in this embodiment, the first capacitor $C_1$ and the second capacitor $C_2$ may be connected to the terminal VCC for receiving power, instead of the pixel negative power source GND.

In this disclosure, the term "capacitor" can be used to refer to capacitors included in a capacitor unit.

Figure 5:
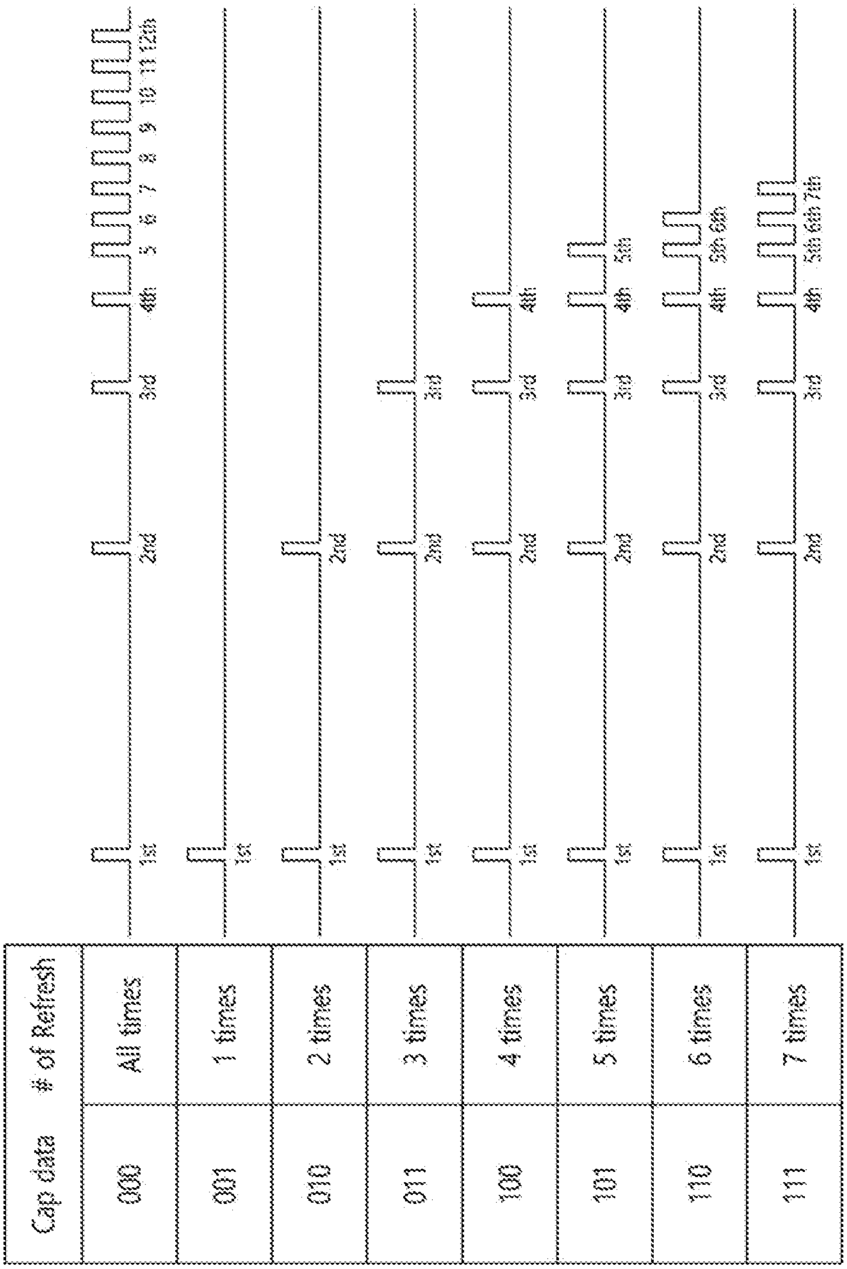
FIG. 5 is a diagram illustrating a number of times of charging a capacitor according to capacitor control data, according to an embodiment.

FIG. 5 is a diagram illustrating the number of times of charging of a capacitor according to capacitor control data, according to an embodiment.

Referring to FIG. 5, an example in which capacitor control data 'Cap data' may be 3-bits and image data may be 12-bits stored in a memory is illustrated.

In the disclosure, bit values of capacitor control data may correspond to a maximum number of times the capacitor may be charged in one cycle (that is, a single frame). That is, the number of times of charging of the capacitor within a single frame may be defined based on the bit values of the capacitor control data.

Referring to FIG. 5, for example, when the bit values of the capacitor control data is <000>, the controller may output a control signal such that the capacitor is charged all twelve times within one cycle. When the bit values of the capacitor control data is <001>, the controller may output a control signal such that the capacitor is charged only once within one cycle. When the bit values of the capacitor control data is <010>, the controller may output a control signal such that the capacitor is charged twice within one cycle. When the bit values of the capacitor control data is <011>, the controller may output a control signal such that the capacitor is charged three times within one cycle. That is, the bit values of the capacitor control data stored in the memory is related to a number of times the capacitor is charged during one cycle, and the controller may output, to the capacitor, a control signal for controlling the charging of the capacitor, based on the capacitor control data stored in the memory. The example illustrated in FIG. 5, however, is provided for better understanding, and the number of bits of the capacitor control data and the number of times of charging according to the capacitor control data may be appropriately set in any manner.

Figure 6:
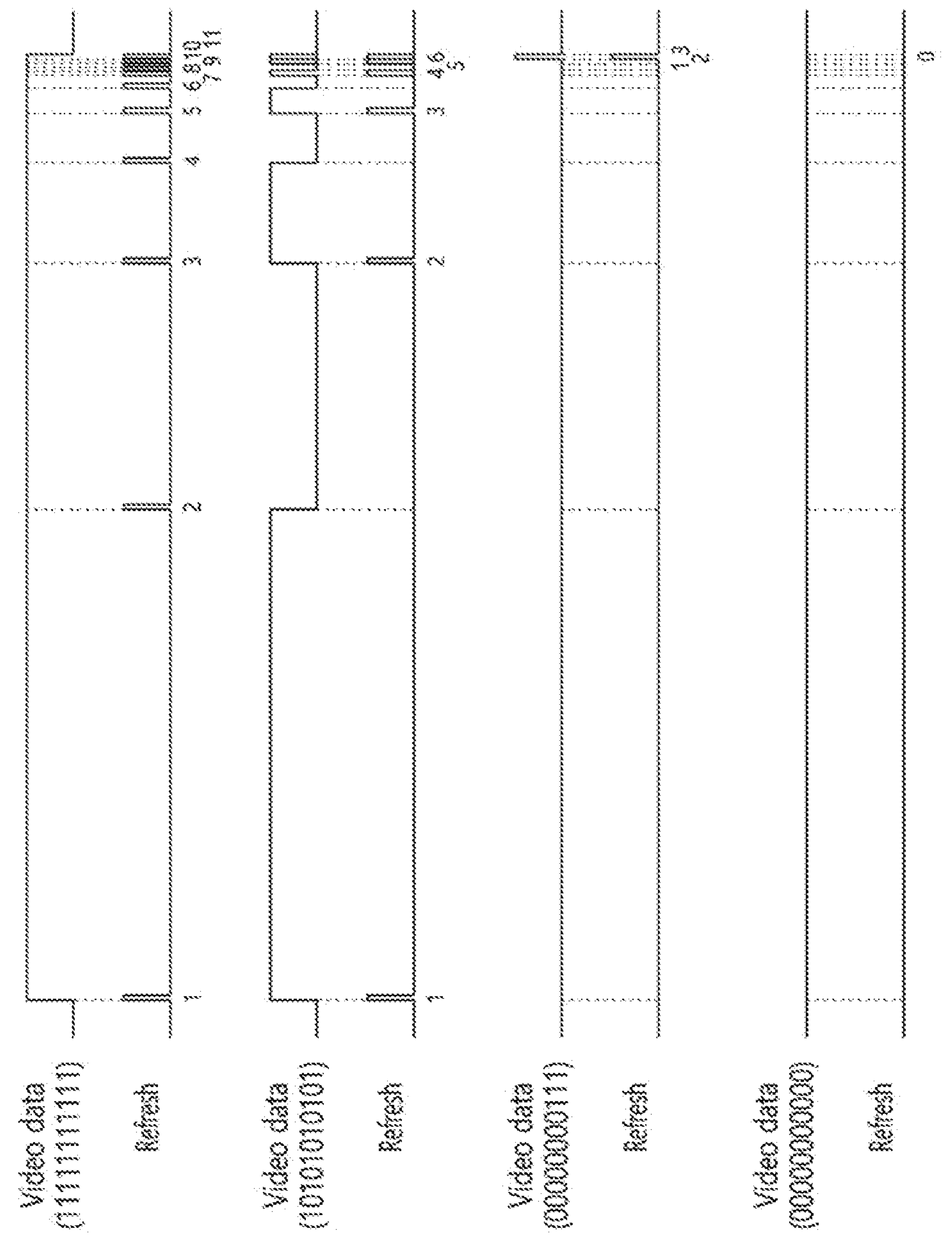
FIG. 6 is a diagram for describing control of whether to supply power by a bias unit, according to an embodiment.

FIG. 6 is a diagram for describing control of whether to supply power by a bias unit, according to an embodiment.

In the disclosure, as described above, a controller may control, through a control signal, whether to supply power by the bias unit.

In an embodiment, the controller may control the bias unit such that power is supplied by the bias unit only in a driving mode. As described above, a pixel driving circuit according to the disclosure may correspond to two modes, a data writing mode or a driving mode. The controller may operate (turn on) the bias unit only when the pixel driving circuit is in the driving mode, thereby reducing power consumption.

In an embodiment, when a capacitor is charged with bias power supplied by the bias unit, the controller may control the bias unit such that the bias unit stops supplying power. When the capacitor is charged, the operation of the bias unit may be restricted, thereby reducing power consumption.

In an embodiment, the controller may control the bias unit such that the bias unit stops supplying power when the capacitor is charged with bias power supplied by the bias unit, and that the bias unit supplies bias power only when a bit value of image data is 1. In other words, in the present embodiment, the controller may read image data stored in the memory, operate the bias unit only in response to image data having a bit value of 1, and limit the operation of the bias unit when the capacitor is charged with bias power. In the present embodiment, the controller may not operate the bias unit in response to image data having a bit value of 0. When a value of the image data is 0, there is no need to drive a light-emitting element, and accordingly, it is also not necessary to charge the capacitor. In the present embodiment, through the control of the operation of the bias unit, when the capacitor does not need to be charged, the bias power supply may be cut off, thereby reducing power consumption.

Referring to FIG. 6, a timing diagram for describing an embodiment in which the controller supplies bias power to the bias unit only when a value of the image data is 1 is shown.

For example, referring to FIG. 6, when image data is (11111111111), all image data have a bit value of 1, and thus, the controller may operate the bias unit in response to all bits of the image data.

Referring to FIG. 6, when image data is (10101010101), the controller may operate the bias unit only in response to image data having a bit value of 1. On the other hand, in response to image data having a bit value of 0, as described above, there is no need to drive a light-emitting element, and thus, a capacitor is not charged. According to the present embodiment, by cutting off the supply of bias power necessary for charging the capacitor, it is implemented that the capacitor is not charged.

FIG. 6 shows that, even when the image data is (00000000111), the capacitor is not charged in response to image data having a bit value of 0.

Referring to FIG. 6, when the image data is (00000000000), all image data values have a value of 0, and thus, the controller may not operate the bias unit in response to all bits of the image data, and accordingly, the capacitor is not charged in response to all bits.

Figure 7:
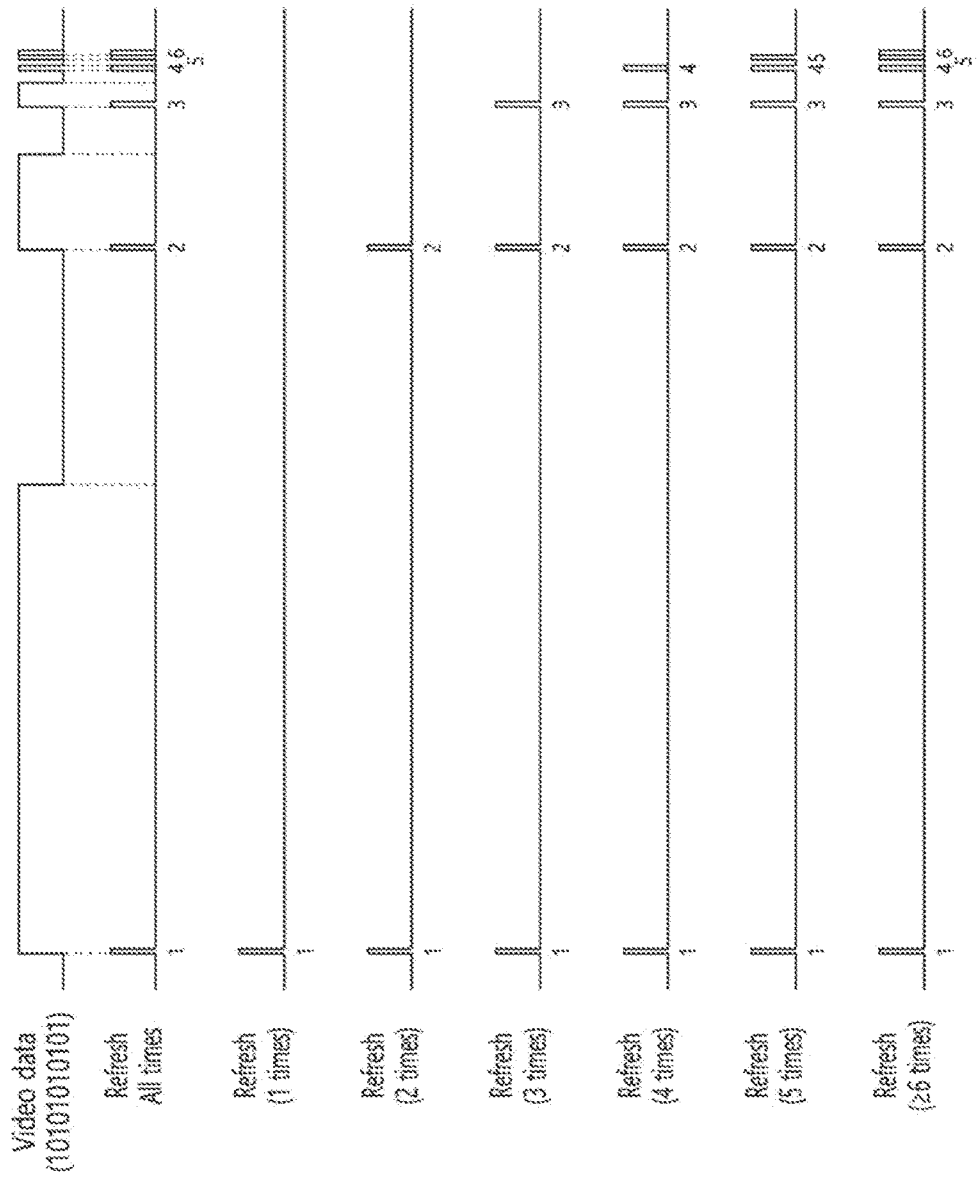
FIG. 7 is a diagram for describing power supply control by a bias unit when a number of times of charging is defined, according to an embodiment.

FIG. 7 is a diagram for describing power supply control according to a bias unit when the number of times of charging is defined, according to an embodiment.

As described above with reference to FIG. 5, the number of times of charging the capacitor within a single frame may be defined based on capacitor control data, and as described above with reference to FIG. 6, the controller may operate the bias unit only in response to image data having a bit value of 1.

In an embodiment, when the number of times of charging is defined, the controller may supply bias power only when the bit value of the image data is 1, and when the capacitor is charged with bias power, the controller may control the bias unit such that the bias unit stops supplying power, and that bias power supply is performed only as many times as a number of times of charging within a single frame. In detail, the controller may operate the bias unit only in response to the image data having a bit value of 1, and the number of times the bias unit is operated within a single frame may be limited. That is, when the number of bits included in image data and having a value of 1 within a single frame exceeds the number of times of charging, the controller may control the operation of the bias unit such that the capacitor is charged in response to, among bits of the image data having a bit value of 1, some bits corresponding to the number of times of charging, and that the capacitor is not charged in response to the remaining bits of the image data. Preferably, the bias unit may be operated in response to a bit value of 1 with respect to higher bits, and when the number of times of operating the bias unit reaches the defined number of times of charging within a single frame, the bias unit may not be operated with respect to lower bits thereafter. In the present embodiment, power consumption may be reduced by the controller cutting off bias power supply with respect to bits exceeding the number of times of charging.

Referring to FIG. 7, when image data is (10101010101), a timing diagram for describing an embodiment of charging the capacitor according to various numbers of charging times is shown.

Referring to FIG. 7, an example in which the number of times of charging is not defined or the capacitor is defined to be charged with respect to all bits of image data, the bits having a bit value of 1, within a single frame (All times) is illustrated. As illustrated, when the number of times of charging is not defined or the capacitor is defined to be charged for all bits of image data within a single frame, the controller may control such that the capacitor is charged in response to all bit values of image data being 1. In other words, the controller may control the bias unit such that the bias power supply is performed in response to all image data having a bit value of 1 within a single frame.

Referring to FIG. 7, an example is illustrated, in which, when the number of times of charging is defined as 1, the capacitor is charged with respect to only one of bits of image data, the bits having a bit value of 1, within a single frame. As illustrated, when the number of times of charging is defined as 1, the controller may allow the capacitor to be charged in response to only one of bits of the image data, the bits having a bit value of 1. In other words, the controller may control the bias unit such that bias power is supplied only once within the single frame.

Similarly, referring to FIG. 7, an example is illustrated, in which, when the number of times of charging is defined as K, the capacitor is charged only for K bits among bits of image data, the bits having a bit value of 1 within a single frame. As illustrated, when the number of charging is defined as K, the controller may allow the capacitor to be charged in response to only K bits among the bits of the image data having a bit value of 1. That is, in the example illustrated in FIG. 7, within a single frame, there are six bits having a bit value of 1 among the image data, but as the number of times of charging is defined as K, the capacitor may be charged in response to only K bits among the six bits, and may not be charged in response to the remaining bits except for the K bits. In other words, the controller may control the bias unit such that bias power is supplied at most K times within a single frame.

Referring to FIG. 7, in the example illustrated in FIG. 7, six bits of the image data have a bit value of 1 within a single frame, and thus, when the number of times of charging is defined as 6 or more, the capacitor may be charged in response to all bits having a bit value of 1.

In the example illustrated in FIG. 7, when the number of times of charging is defined, the capacitor may be charged preferentially in response to, among bits of the image data having a bit value of 1, higher bits, but this is provided as an example, and any suitable method may be applied here.

The image data illustrated in FIG. 7 is provided as an example, and it will be obvious to those skilled in the art that the method according to the disclosure may be applied to image data including a number of bits, a bit value, and a number of bits having a bit value of 1 in any single frame.

In an embodiment, the number of times of charging the capacitor within a single frame of may be defined by a user.

The scan driving circuit and the data driving circuit described above may include a processor, an application-specific integrated circuit (ASIC), another chipset, a logic circuit, a register, a communication modem, or a data processing device and the like, which are known in the art to execute various control logic described above. In addition, when the above-described control logic is implemented in software, the scan driving circuit and the data driving circuit may be implemented as a set of program modules. The program modules may be stored in a memory device and executed by the processor.

For a computer to read a program and execute methods implemented with the program, the program may include code written in computer language, such as C/C++, C#, JAVA, Python, and machine language that the computer's processor (CPU) can read through a device interface of the computer. The code may include functional code related to a function defining functions necessary for executing the methods, and may control code related to an execution procedure required for the processor of the computer to execute the functions in a certain procedure. In addition, the code may further include additional information necessary for the processor of the computer to execute functions or code related to memory reference regarding which location (address number) in an internal or external memory of the computer should be referenced. In addition, when the processor of the computer needs to communicate with any other remote computer or server to execute functions, the code may further include code related to communication, as to how to communicate with any other remote computer or server by using a communication module of the computer, or which information or media should be transmitted and received during communication.

A storage medium in which a program is stored is not a medium that stores data for a short moment, such as a register or a cache memory, but a medium that stores data semi-permanently and can be read by a device. Examples of the storage medium include a read-only memory (ROM), random access memory (RAM), compact-disc ROM (CD-ROM), a magnetic tape, a floppy disk, and an optical data storage device, but are not limited thereto. That is, the program may be stored in various recording media on various servers that the computer can access or in various recording media on a computer of the user. In addition, the storage medium may be distributed in computer systems connected through a network, and computer-readable codes may be stored in a distributed manner.

By reducing the number of times of charging a capacitor, power consumed to drive pixels may be reduced.

In addition, by selectively supplying bias power required for charging of the capacitor, power consumed to drive pixels may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pixel driving circuit for driving a luminous element by a pulse width modulation (PWM) operation, the pixel driving circuit comprising:
- a first memory configured to store multi-digit bit values of image data;
- a driver connected to the luminous element and configured to control a power supply to the luminous element according to each bit value of the image data, wherein the driver including a capacitor for charging a voltage required for driving the luminous element;
- a bias circuit configured to supply and not to supply power to the capacitor of the driver according to each bit value of the image data; and
- a controller configured to:
  - control the bias circuit to supply the power to charge the capacitor when each digit of the image data stored in the first memory has a bit value of 1; and
  - control the bias circuit not to supply the power to the capacitor when each digit of the image data stored in the first memory has a bit value of 0.

2. A pixel driving circuit for driving a luminous element by a pulse width modulation (PWM) operation, the pixel driving circuit comprising:
- a first memory configured to store bit values of image data;
- a driver connected to the luminous element and configured to control a power supply to the luminous element according to the image data, wherein the driver including a capacitor for charging a voltage required for driving the luminous element;
- a second memory configured to store bit values of charging control data that is a maximum number of times the capacitor is charged during one period;
- a bias circuit configured to supply a power to the driver; and
- a controller configured to operate the bias circuit for supplying the power only in response to the image data stored in the first memory having a bit value of 1,
- wherein the driver comprises:
  - a charging transistor configured to supply the power from the bias circuit to the capacitor;
  - a discharging transistor configured to supply the power to the luminous element by discharging the stored power in the capacitor; and
  - a switch between the charging transistor and the capacitor;
  - wherein the capacitor is connected between the switch and a gate terminal of the discharging transistor, and the charging or discharging of the power in the capacitor are controlled by controlling on or off the switch.

3. The pixel driving circuit of claim 1, wherein the controller configured not to operate the bias circuit when each digit of the multi-digit bit values of the image data stored in the first memory has a bit value of 0, so that the power supplying to the capacitor is cut off.

4. The pixel driving circuit of claim 1, further comprising:
- a second memory configured to store bit values of charging control data that indicates a maximum number of times the capacitor is to be charged during one period, wherein
  - when the number of times of operating the bias circuit reaches the maximum number of times defined by the bit values stored in the second memory, the bias circuit is not operated with respect to lower bits thereafter.

5. The pixel driving circuit of claim 4, wherein the one period is one PWM cycle or a single frame.

* * * * *